(12) United States Patent
Lemoine et al.

(10) Patent No.: US 8,312,370 B2
(45) Date of Patent: Nov. 13, 2012

(54) SYSTEM AND METHOD OF HARDWARE-ASSISTED ASSEMBLY OF DOCUMENTS

(75) Inventors: Eric T Lemoine, La Jolla, CA (US); Tak Sze, San Diego, CA (US); Eric Shoquist, Escondido, CA (US); Mario Niebla, San Diego, CA (US); Michael Leventhal, San Diego, CA (US)

(73) Assignee: LSI Corporation, Milpitas, CA (US)

(*) Notice: Subject to any disclaimer, the term of this patent is extended or adjusted under 35 U.S.C. 154(b) by 918 days.

(21) Appl. No.: 12/401,445

(22) Filed: Mar. 10, 2009

(65) Prior Publication Data

US 2010/0231975 A1    Sep. 16, 2010

(51) Int. Cl.
*G06F 17/00*    (2006.01)

(52) U.S. Cl. ........ 715/255; 715/200; 715/221; 715/222; 715/223; 715/234; 715/242; 715/252

(58) Field of Classification Search .......... 715/200, 715/221, 223, 234, 242, 255, 252
See application file for complete search history.

(56) References Cited

U.S. PATENT DOCUMENTS

| | | | | |
|---|---|---|---|---|
| 5,544,285 | A * | 8/1996 | Glaser et al. | 715/224 |
| 5,845,302 | A * | 12/1998 | Cyman et al. | 715/209 |
| 7,610,548 | B1 * | 10/2009 | Brinkman et al. | 715/221 |
| 7,665,015 | B2 * | 2/2010 | Dignum et al. | 715/234 |
| 7,940,929 | B1 * | 5/2011 | Sengupta | 380/51 |
| 8,055,997 | B2 * | 11/2011 | Gagnon | 715/222 |
| 2001/0013045 | A1 * | 8/2001 | Loschky et al. | 707/530 |
| 2002/0073125 | A1 * | 6/2002 | Bier | 707/530 |
| 2005/0193334 | A1 * | 9/2005 | Ohashi et al. | 715/517 |
| 2006/0075331 | A1 * | 4/2006 | Itani | 715/513 |
| 2006/0107206 | A1 * | 5/2006 | Koskimies | 715/523 |
| 2006/0107224 | A1 * | 5/2006 | Friend et al. | 715/764 |
| 2006/0282771 | A1 * | 12/2006 | Vinci | 715/530 |
| 2007/0113222 | A1 * | 5/2007 | Dignum et al. | 717/143 |
| 2007/0136682 | A1 * | 6/2007 | Stienhans | 715/789 |
| 2008/0126396 | A1 * | 5/2008 | Gagnon | 707/102 |
| 2009/0172517 | A1 * | 7/2009 | Kalicharan | 715/234 |
| 2009/0271694 | A1 * | 10/2009 | Bayliss | 715/219 |
| 2011/0202824 | A1 * | 8/2011 | Raje | 715/224 |

OTHER PUBLICATIONS

Tectite, Creating HTML Forms, published Mar. 5, 2008 shown using Wayback, Tectite.com, pp. 1-8; http://web.archive.org/web/20080305201150/http:/tectite.com/fmdoc/creating_forms.php.*
Russell Robinson of Tectite, "Thread: Don't Display Empty Fields", Tectite.com, pp. 1-4' http://www.tectite.com/vbforums/showthread.php?433-Don-t-Display-Empty-Fields.*

* cited by examiner

*Primary Examiner* — Cesar Paula
*Assistant Examiner* — David Faber

(57) ABSTRACT

Described embodiments provide a system for assembly of structured documents having at least a memory, a processor, and a circuit. The memory stores documents. The processor identifies a template for generating a document. The template defines fields having a specified position and length within the document. The processor stores characters based on data associated with fields to locations of memory associated with the fields. Based partly on the text and length of the field, the processor stores indicators for portions of fields to be removed from the document. An indicator includes one or more specified character values, which may include a first byte value indicative of a start-of-heading character, and a second of byte value indicative of a number of characters to be removed. A circuit accesses the document from the memory and removes portions of fields based on the indicators to generate a portion of an assembled document.

14 Claims, 5 Drawing Sheets

```
<Employe idnum="......................">
    <FirstName>.....................................</FirstName>
    <LastName>.....................................</LastName>
    <BirthDate>..............</BirthDate>
    <OfficePhoneNumber>..............</OfficePhoneNumber>
    <JobPosition>..............</JobPosition>
    <JobTitle>..............</JobTitle>
</Employe>
```

FIG. 2A

```
<Employe idnum="67235491-24......">
    <FirstName>Oliver.....................................</FirstName>
    <LastName>Torczon.....................................</LastName>
    <BirthDate>08/07/1971</BirthDate>
    <OfficePhoneNumber>14085551234</OfficePhoneNumber>
    <JobPosition>Engineer Level 4..............</JobPosition>
    <JobTitle>..............</JobTitle>
</Employe>
```

FIG. 2B

```
<Employe idnum="67235491-24">
    <FirstName>Oliver</FirstName>
    <LastName>Torczon</LastName>
    <BirthDate>08/07/1971</BirthDate>
    <OfficePhoneNumber>14085551234</OfficePhoneNumber>
    <JobPosition>Engineer Level 4</JobPosition>
</Employe>
```

FIG. 2C

SYSTEM AND METHOD OF HARDWARE-ASSISTED ASSEMBLY OF DOCUMENTS

BACKGROUND OF THE INVENTION

1. Field of the Invention

The invention relates to systems and methods for generating structured documents such as extended markup language (XML) documents.

2. Description of the Related Technology

Extensible markup language (XML) is a data description language that provides a mechanism to represent structured data in way that retains the logical structure and interrelationship of the underlying data. In XML, data is represented as Unicode text using standardized markup syntax to express the structural information about that data. In brief, XML syntax includes tags (a string bracketed by '<' and '>') and attributes (syntax of the form attribute_name="value") that define elements of a document. The particular tags and attributes used in a document may be selected with reference to the type of data that is represented by a particular document. Moreover, an XML document may be constructed to conform to a document type declaration (DTD) or an XML schema, which are a formal descriptions of a particular type of document. It sets forth what elements the particular type of document may contain, the structure of the elements, and the interrelationship of the elements.

While XML is human readable, XML documents, particularly those which conform to a well-known or standardized schema, provide a convenient means of data exchange between computer programs in general, and on the Internet in particular. However, many of XML's features, as well as the use of text and the structures encoded within the text, make XML document processing processor intensive. Thus, in systems that exchange a high volume of XML data, e.g., e-commerce systems that process XML encoded security data, XML documents may be electronically generated from databases or other sources of data. Such generation of document may tend to consume so much of a server's processing power that the amount of processing power remaining to actually generator or apply the XML data for the relevant application may be impacted. Thus, resource efficient systems and methods of generating and processing XML documents are needed.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include increased efficiency and throughput of document generation.

One embodiment comprises a system for assembly of structured documents. The system includes a memory configured to store documents and at least one processor configured to identify a template for generating a document. The template defines at least one field having a specified position and length within the document. The processor is further configured to store a copy of the template to the memory so as to initialize the document, store characters based on data associated with the at least one field to a location of the memory associated with the at least one field of the document. Based at least in part on the text and the length of the field, the processor stores to portions of the memory associated with the document at least one indicator of at least one portion of the at least one field to be removed from the document. The system further comprises at least one circuit configured to access the document from the memory and remove the portion of the at least one field based on the at least one indicator so as to generate a portion of an assembled document.

Another embodiment comprises a method of generating structured documents. The method comprises identifying a template for generating a document. The template defines at least one field having a specified position and length within the document. The method further comprises storing a copy of the template to the memory so as to initialize the document and storing, by at least one processor, characters based on data associated with the at least one field to a location of the memory associated with the at least one field of the document. The method further comprises, based at least in part on the text and the length of the field, storing, by the processor, to portions of the memory associated with the document, at least one indicator of at least one portion of the at least one field to be removed from the document. The method further comprises accessing the document from the memory by at least one circuit, removing, by the at least one circuit, the portion of the at least one field based on the at least one indicator so as to generate a portion of an assembled document, and outputting the portion of the assembled document by the at least one circuit.

Another embodiment comprises a system for assembly of structured documents. The system comprises means for storing documents, means for processing configured to identify a template for generating a document. The template defines at least one field having a specified position and length within the document. The processing means is further configured to store a copy of the template to the memory so as to initialize the document, store characters based on data associated with the at least one field to a location of the memory associated with the at least one field of the document, and based at least in part on the text and the length of the field, store, to portions of the memory associated with the document, at least one indicator of at least one portion of the at least one field to be removed from the document. The system further comprises means for accessing the document from the memory and removing the portion of the at least one field based on the at least one indicator so as to generate a portion of an assembled document.

BRIEF DESCRIPTION OF THE DRAWINGS

FIGS. 2A-2C illustrate examples of documents at different points during document generation using a system such as illustrated in FIG. 1.

DETAILED DESCRIPTION OF CERTAIN EMBODIMENTS

Figure 1:
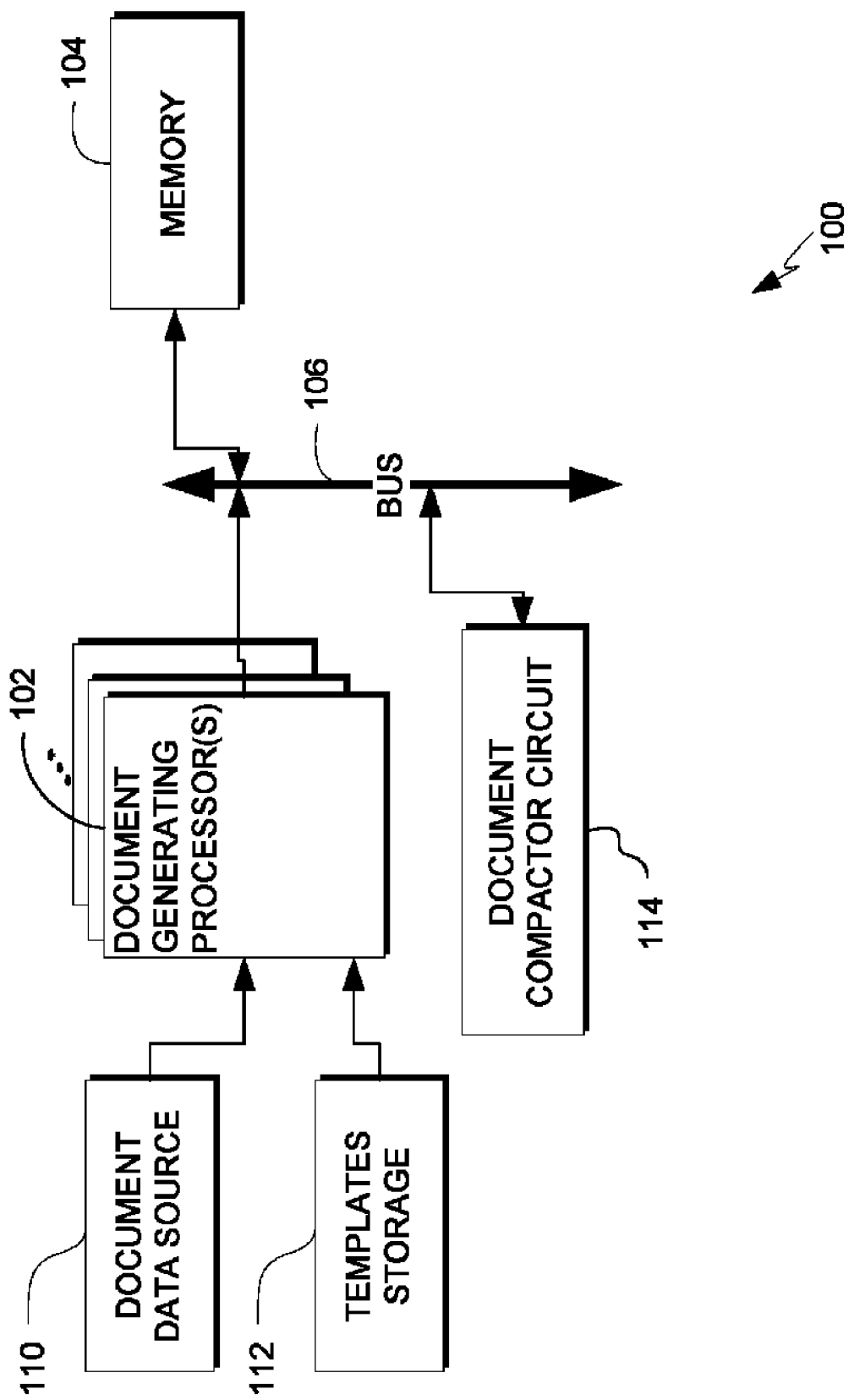
FIG. 1 is a block diagram illustrating one embodiment of a system for generating XML or other structured documents.

The following detailed description is directed to certain specific embodiments of the invention. However, the invention can be embodied in a multitude of different ways as defined and covered by the claims. In this description, reference is made to the drawings wherein like parts are designated with like numerals throughout.

Mapping and transformation algorithms for generating text documents are generally sequential processes. For example, a generated document generally comprises a continuous sequence of characters. Hence, manipulation on a subpart of the document is based on where the subpart will be in the final sequence of characters that make up the document. However, the precise placement of any given subpart is not known until all the subparts that come earlier in the sequence are generated, leading to a sequential algorithm.

For example, one embodiment includes a system and method accelerating XML mapping and transformation. XML mapping and transformation is commonly used in software systems to enable exchange of information or business documents between computer systems. In one embodiment, XML mapping or transformation comprises the generation of a new XML/text document based an information source such as a database extract, another XML document, or other types of sources that could be translated from its original format to the final XML representation.

In one embodiment, to generate documents, source information is gathered and assembled into the final document structure. While methods have been developed to optimize manipulation of data structures representing the information source, existing methods fail to improve performance of assembly of the source data and generation of the new text document. However, in some cases, more than 90% of the overall process time alone can be consumed by document assembly. For example, one simple way of reassembly of source data and generation of the new text document includes performing hundreds of copies of very small portions of random memory per kilobyte of text generated to assemble text/string data in a computer memory. Many modern processors have a memory hierarchy that includes one or more caches between the processor and memory bus to reduce memory latency. Such memory hierarchies are traversed in a highly inefficient manner using such simple ways of generating documents due to unaligned memory access and due to memory access patterns that have a low hit rate with such caches leading to many wasted processor cycles per byte processed due to, for example, added memory latency.

In one embodiment of generating XML documents, the structure of a new document is known while the data content varies from document to document. For example, a document template may be derived based on a particular XML Schema and/or DTD. Hence, data content is retrieved and inserted within the known structural skeleton or template. This insertion of data that causes a ripple of random unaligned data movement across the entire document. Such data copying can result in poor performance on many memory architectures because the transformation does not take advantage of the cache hierarchy of the processing system. Moreover, the sequential nature of the document generation makes it difficult to take advantage of multicore and multiple processors.

One embodiment comprises a document generation system in which document templates are generated sized to receive all or a substantial portion of expected data for fields of the document. For example, in one embodiment, an initial version of a document is generated based on, e.g., copied from, a specified document template that comprises oversized fields or slots. The document is hence initially generated using one or more processors from the template and stored to a memory. For example, one or more processors identify and access data and insert the data into the fields leaving stretches of unused space within the partially generated document. Data values are inserted into the initial document leaving unused portions of fields where the data values are less than the specified size of the field in the template. A hardware circuit, implemented, for example, as an application specific integrated circuit (ASIC) or programmable gate array, is configured to access partially generated documents via its own memory bus interface, e.g., a direct memory access (DMA) interface, and to assemble string data to transform the document as initially generated from a template and data insertions into a compacted version of the document. The circuit thus simplifies and increases system utilization efficiency of the insertion of data into a specified template of the document by reducing or eliminating shifting of strings by a general purpose processor.

The assembly/compactor circuit thus removes such unused space left in each field once data has been inserted into the corresponding field in the template. Accordingly, in one embodiment, a performance gain can be obtained because the number of data copies is drastically reduced. In addition, assembly can be performed via the DMA interface between the assembly circuit and main memory so as to reduce impact of assembly on the memory hierarchies of the processors. DMA between host memory and the assembly circuit can be performed independently of the processors and can hence be very efficient, typically capable of sustaining output of gigabytes per second rather than megabytes per second with simple assembly approaches.

FIG. 1 is a block diagram illustrating one embodiment of a system 100 for generating XML or other structured documents. The system 100 comprises one or more document generating processors 102 connected to a memory 104 via a bus 106. The document generating processors 102 receive source data for structured documents to be generated from one or more document data sources 110. A templates storage 112 provides one or more templates for producing a particular structure document based on data from the document data source 110. The processor 102 is configured to identify a template from the templates storage 112 and to generate a particular document based on the template and data from the document data sources 110. A document compactor circuit 114 access an initially generated version of the document and removes indicated portions of data fields from the document.

The processors 102 may comprise one or more general or special purpose processors. The processors 102 may be central processors of a computer system or processors associated with a peripheral or accelerator system. For example, embodiments may comprise content processor cards for accelerating document generation. In another embodiment, the processor 102 may be part of a network interface or other peripheral processor. The memory 104 may comprise dynamic or static random access memory (RAM), non-volatile memory such as flash or disk based storage, or a combination of one or more such memory types such as in a memory hierarchy of RAM backed by non-volatile memory, or in a virtual memory model. In addition, the processors 102 may comprise one or more levels of cache memory to cache portions of the contents of the memory 104.

The bus 106 may comprise one or more architectures such as Peripheral Component Interconnect (PCI), PCI Express, Hypertransport, QPI, or any other suitable any suitable bus. In one embodiment, the processor 102 and/or the compactor circuit 114 may access the memory via a direct memory access (DMA) interface provided by the bus.

The document data sources 110 may comprise software applications executing on the processors 102 or other processors (not shown) in communication with the processors 102 and which provide document data to the processors 102 for generating documents. The document data sources 110 may also comprise data stores or databases accessible by the processors 102 via the bus 106 or another interface. The templates storage 112 may comprise storage for one or more templates of documents to be generated by the processors 102. As illustrated in more detail below, the templates may be in a structured form of data fields to be filed with data from the data store 110. In one embodiment, the templates storage 112 may include other memory or storage. In one embodiment, the templates storage 112 may be utilize a portion of the memory 104 to store templates. The templates may be for any suitable type of generated document. In one embodiment, the templates are XML templates that define one or more XML elements with placeholders for insertion of document values related to particular XML tags or attributes.

In operation, the template defines one or more fields having a specified position and length within the document. The processor 102 stores a copy of the template to the memory so as to initialize the particular document. The processor stores characters based data received from the document source data 110 associated with at least a portion of the fields (e.g., applicable fields for a particular data set) to a location of the memory associated with each field. Based at least in part on the text and the length of each field, one or more indicators of at least one portion of the at least one field to be removed from the document is stored in locations associated with each field.

In one embodiment, the indicator(s) of field portions to be removed from documents is stored in the initial copy of the template to the memory 104, e.g., from the template itself In another embodiment, the indicator(s) field portions to be removed is stored in the field memory locations as data is stored to the field. In another embodiment, both approaches are combined on a field by field basis as appropriate based on, for example, the size of the field, the type of data to be stored in the field, and whether the field receives any data for a particular document. For example, templates may be initially stored with data indicating that some or all fields are to be removed. As data is written to a field, this indicator data is replaced with actual field data and any further indicator of excess field portions to be removed.

The initial document that is generated based on the template and using the source data 110 is stored to the memory 104. The document compactor circuit 114 accesses and processes the document from the memory 104. In one embodiment, the document compactor circuit 114 accesses the memory 102 via a DMA interface. The DMA interface may be separate of a memory interface of the processor 102 so as to reduce impact on the processor 102 for processing by the compactor circuit 114. The document compactor circuit 114 reads the document from the memory, removes the portion or portions of each of the fields based on the indicators the portions to be removed so as to assemble an assembled document that is reduced in size relative to the initial document. The compactor circuit 114 may output the assembled document back to the same, or a different, portion of the memory 104. In another embodiment, the compactor circuit 114 may output the assembled document to another memory or processor, or to a network interface. Accordingly, compactor circuit 114, via DMA transfers, stitches the block together seamlessly and substantially independently of the processor (s) 102. The impact on the processor memory hierarchy is thereby minimized as only a small amount of data is written to memory. Further, a bulk portion of document generation can be performed offline in the preparation of the templates.

Those of skill will recognize that the various illustrative logical blocks, modules, circuits, and algorithm steps described in connection with the embodiments disclosed herein may be implemented as electronic hardware, computer software executed by on or more processors, or combinations of both. To clearly illustrate this interchangeability of hardware and software, various illustrative components, blocks, modules, circuits, and steps have been described above generally in terms of their functionality. Whether such functionality is implemented as hardware or software executed by a processor depends upon the particular application and design constraints imposed on the overall system. Skilled artisans may implement the described functionality in varying ways for each particular application, but such implementation decisions should not be interpreted as causing a departure from the scope of the present invention. For example, the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Such components may comprise, for example, a general purpose computer or server, or a component subsystem such as a special purpose processor, a network interface card, or any other electronic device as may suit a particular application.

FIGS. 2A-2C illustrate examples of documents at different points during generation using the system 100. In particular, FIG. 2A illustrates a document template (and/or a document initially copied from a template) that includes an employee element (defined by the "employee" tags) having identifier, name, personal information, and job position and title sub-elements delineated by associated tags such as "idnum," "FirstName," "LastName," "BirthDate," "OfficePhoneNumber," "JobPosition," and "JobTitle." The dots (".") in the template data indicate field positions to be filled with data. The field positions may be filled with any data. In one embodiment, the field positions are initialized to data indicating that the field position should be removed from the final document. For example, in one embodiment, the field positions in the template are filled with NULL (zero valued) values such as ASCII NULL or a suitable counterpart in a character encoding used for a particular template and document.

FIG. 2B illustrates the example document of FIG. 2A subsequent to the processor 102 inserting data into each of the relevant fields of the example document. Where the data inserted uses less than all of the locations associated with a particular field, the indicator (e.g., NULL) characters shown as "." characters remain. In this example document, the "JobTitle" field is not used. Hence, an indicator character, in this case an ASCII Start-of-heading (SOH, with a value of 1) is used to indicate that subsequent characters are to be removed from the document. In FIG. 2B, the indicator character is illustrated as a "1" followed by an "n," which in operation would, in this example, be the number of characters, e.g., 110, to remove and which would be a value that would include document characters up to the end of the "</JobTitle>" tag.

FIG. 2C illustrates the example document of FIGS. 2A and 2B subsequent to the compactor circuit 114 removing the indicated portions of the example document. As shown, only the portions of the fields (in this case XML elements) remain illustrating the resulting compacted document.

Figure 3:
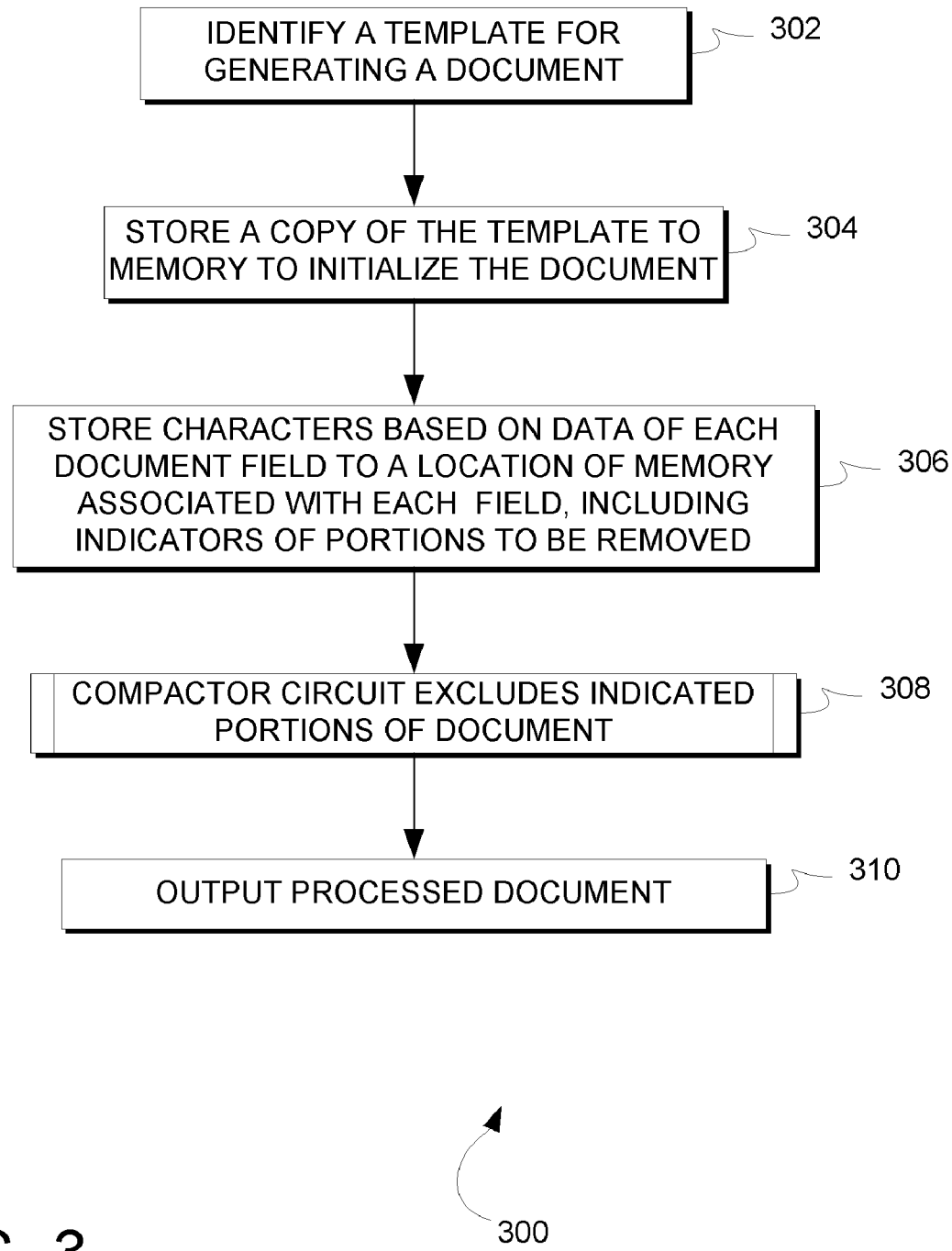
FIG. 3 is a flowchart illustrating an embodiment of a method of generating documents in a system such as illustrated in FIG. 1.

FIG. 3 is a flowchart illustrating an embodiment of a method 300 of generating documents in the system 100. The method begins at a block 302 in which the processor identifies a particular template such as from the templates storage 112 for generating a document. In one embodiment, an application program executed by the processor 102, or executed by another processor in communication with the processor 102, provides data to the processor 102 indicative of the template, or identifies the template. Next at a block 304, a processor such as the processor 102 stores a copy of the template to the memory 104 to initialize the document.

Moving to a block 306, the processor 102 stores characters based on data of each document field to a location of the memory 104 associated with each field of the document as specified by the template. The character data stored to the fields is generated based on data received from the document data sources 114. The stored document characters include indicators of portions to be removed. Examples of such indicators are discussed above with reference to FIG. 2B. In addition to NULL and start-of-heading characters discussed above, embodiments may include other indicator characters. For example, in one embodiment, portions of fields to be removed are indicated, and delineated, by start and end characters, e.g., ASCII start of text (STX, value 3) and ASCII end of text (ETX, value 4). It is to be recognized the indicators discussed herein are merely examples. Any character or string of characters may be associated with an indicator in a particular embodiment.

Desirably, in one embodiment, multiple processors 102 concurrently store data to different fields of the document being assembled. Because the fields in the template have specified locations within the initially generated document, the processors 102 can operate concurrently on the document.

Moving to a block 308, the processor 102 instructs compactor circuit 114 to process the document from the memory 104 and exclude indicated portions of the document. In one embodiment, the processor 102 instructs the circuit 114 via the bus 106. In another embodiment, one or more control or communication lines are provided between the processor 102 and the circuit 114. In another embodiment, the circuit 114 monitors specified locations in the memory 104, which are thus used to communicate with the processor 114. Upon receipt of such instruction, the compactor circuit 114 removes the indicated field locations from the document. Next at the block 310, the compactor circuit 114 outputs the processed document. In one embodiment, the document is output to the memory 104. In another embodiment, the document is output to another device or interface, e.g., to a network interface.

Figure 4:
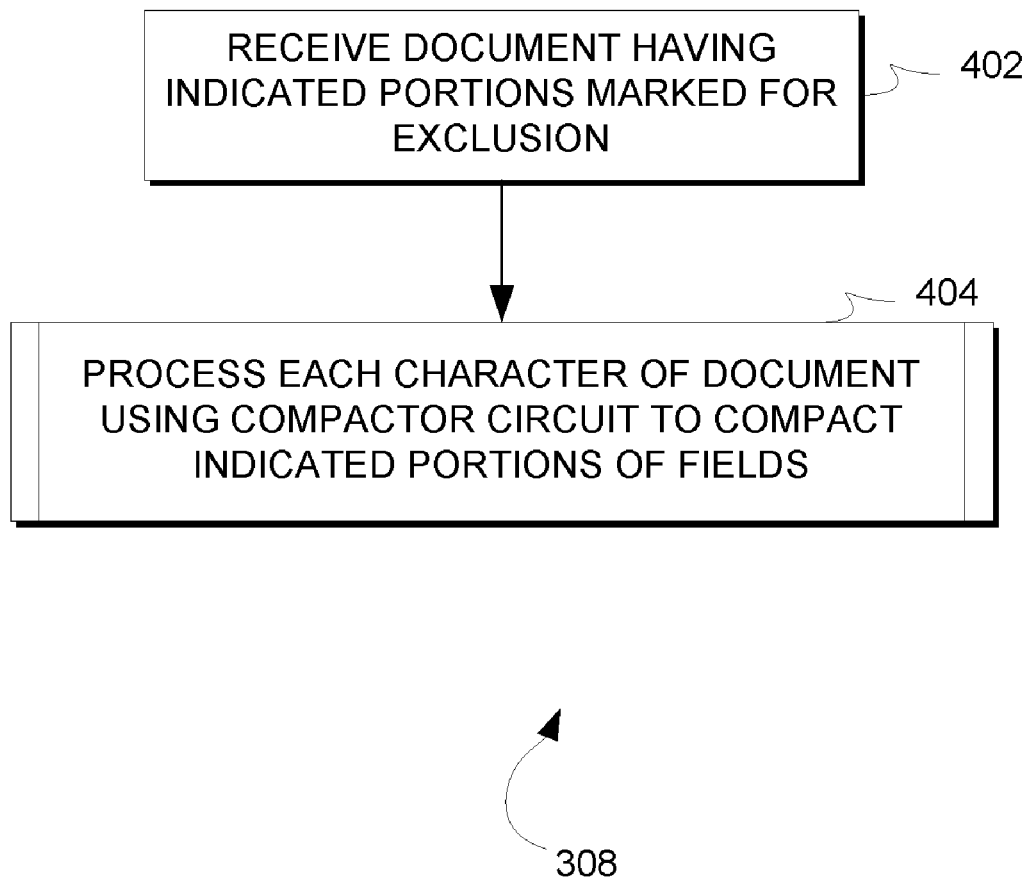
FIG. 4 is a flowchart illustrating portions of the method of FIG. 3 in more detail.

FIG. 4 is a flowchart illustrating portions of the method 300 of FIG. 3 in more detail. In particular, the acts and events associated with the block 308 are illustrated in more detail beginning at a block 402 in which the compactor circuit 114 receives the document having indicated portions marked for exclusion (e.g., in the state as illustrated in FIG. 2A). In one embodiment, the compactor circuit 114 receives the document via DMA access independent of the processor 102. Moving to a block 404, the compactor circuit 404 processes characters of document to compact, e.g., remove from the document, the indicated portions of the document fields.

Figure 5:
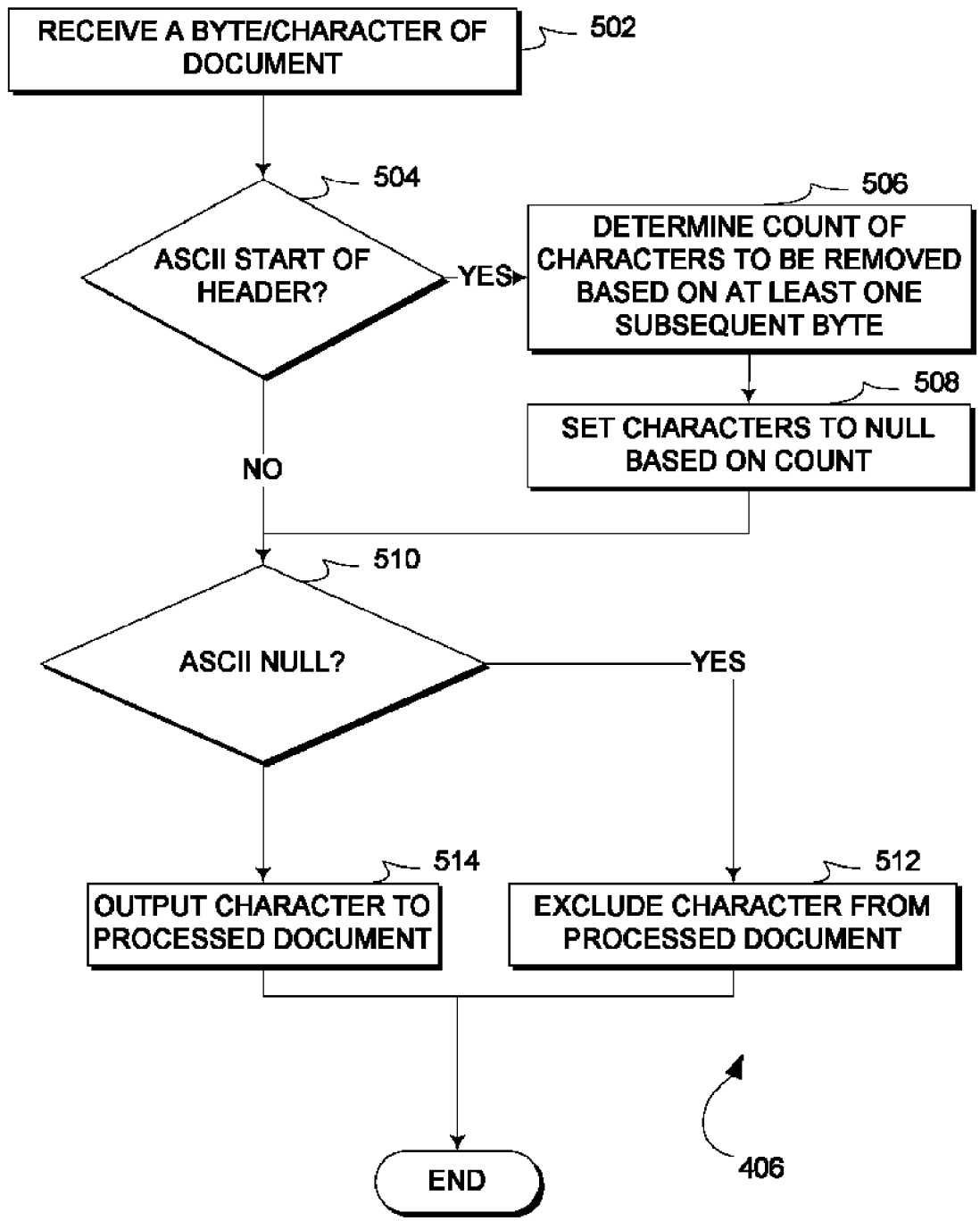
FIG. 5 is flowchart further illustrating portions of the method of FIG. 3 in more detail, including character processing/compacting of partially generated documents.

FIG. 5 is flowchart further illustrating portions of the block 406 of FIG. 3 in more detail, including per character processing/compacting of partially generated documents. Beginning at a block 502, the compactor 114 receives a character of the document to process. In one embodiment, each character comprises one or more bytes of the document. In a simple encoding such as ASCII, each character is a single byte of data. In other document encodings, such as UTF-8 or Unicode, each character is indicative of one or more bytes of data. Next at a decision block 504, the compactor circuit 114 determines if the character is an ASCII start-of-heading indicative of a block of characters to remove. If not, the method proceeds to a block 510 discussed below. If the character is a start (of exclusion) indicator, the method proceeds to a block 506 in which the compactor circuit 114 receives the next (sequential) byte (or in other embodiments, bytes) in the document which determines the count of characters to be removed. In one embodiment, the next sequential byte provides a value of up to 255 characters to remove. In other embodiments, a number of bytes may be specified to allow greater (than 225) ranges of deletion to be specified. Alternatively, in embodiments in which a single byte is used, multiple indicators may be inserted to define remove of more than 255 consecutive characters. Moving to a block 508, the compactor 114 sets characters to NULL based on the count. Alternatively, the compactor circuit 114 may proceed to skip its character position in the document ahead in the document to exclude the indicated count of characters from the processed document. In one embodiment in which the character is set to NULL, the method returns to the block 510.

Moving to the block 510, the compactor circuit 114 determines if the character is an indicator of a character to be excluded from the document, e.g., an ASCII NULL. If the character is to be excluded, the method proceeds to a block 512 in which the character is excluded from the processed document. In one embodiment, such exclusion is performed by incrementing the position of the processing by the compacter within the document without outputting any data to the processed, compacted document.

Returning to the decision block 510, if the character is not NULL and the document data does not otherwise indicate that the character should be excluded, the method proceeds to a block 514 in which the character is output to the processed, compacted document.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially. For example, the compactor circuit 114 may comprise more than one parallel compactor circuit that may operate concurrently.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a television or other access device. In the alternative, the processor and the storage medium may reside as discrete components in a television or other access device.

In view of the above, one will appreciate that the invention overcomes problems such as efficiently generating template based documents. For example, inefficient shifting of strings within memory as documents are assembled is avoided. Such shifting may not only inefficiently use processor cycles, but also can result in misaligned data accesses and inefficient use of processor caches. Therefore, one embodiment provides a hardware compactor circuit that accesses documents via its own memory interface to efficiently compact documents formed initially from templates. Documents can thus be produced without unneeded filler consuming memory and transmission bandwidth and with reduced processing required for generation.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A system for assembly of structured documents, the system comprising:
   a memory configured to store documents;
   at least one processor configured to:
      identify a template for generating a document, wherein the template defines at least one field having a specified position and length within the document;
      store a copy of the template to the memory so as to initialize the document;
      store characters based on data associated with the at least one field to a location of the memory associated with the at least one field of the document,
      wherein, based at least in part on the text and the length of the field, the processor stores, to portions of the memory associated with the document, at least one indicator of at least one portion of the at least one field to be removed from the document;
      wherein the at least one indicator of the at least one portion of the at least one field to be removed comprises at least one specified character value;
      wherein the at least one specified character value comprises at least two byte values, the byte values comprising a first of the byte values indicative of a start-of-heading of a character encoding of the document and at least a second of the byte values indicative of a number of characters to be removed from the document; and
   at least one circuit configured to:
      access the document from the memory; and
      remove the at least one portion of the at least one field based on the at least one indicator so as to generate a portion of an assembled document.

2. The system of claim 1, wherein the template comprises an XML template and the at least one field comprises an XML element.

3. The system of claim 1, wherein the assembled document is reduced in size relative to the document as copied from the template.

4. The system of claim 1, wherein the at least one specified character value comprises a NULL value of a character encoding of the document.

5. The system of claim 1, wherein the circuit is configured to access the document memory via a DMA interface.

6. The system of claim 1, wherein the processor and circuit are embodied as at least one of an application specific integrated circuit, a field programmable gate array, a network interface card, or a peripheral bus card.

7. The system of claim 1, wherein the at least one processor comprises a plurality of processors, wherein the at least one field comprises a plurality of fields and wherein each of the processors is configured to concurrently store characters based on data associated with a respective at least one of the fields to a location of the memory associated with the respective at least one of fields.

8. A method of generating structured documents, the method comprising:
   identifying a template for generating a document, wherein the template defines at least one field having a specified position and length within the document;
   storing a copy of the template to a memory so as to initialize the document;
   storing, by at least one processor, characters based on data associated with the at least one field to a location of the memory associated with the at least one field of the document,
   based at least in part on the text and the length of the field, storing, by the at least one processor, to portions of the memory associated with the document, at least one indicator of at least one portion of the at least one field to be removed from the document;
   wherein the at least one indicator of the at least one portion of the at least one field to be removed comprises at least one specified character value;
   wherein the at least one specified character value comprises at least two byte values, the byte values comprising a first of the byte values indicative of a start-of-heading of a character encoding of the document and at least a second of the byte values indicative of a number of characters to be removed from the document; and
   accessing the document from the memory by at least one circuit;
   removing, by the at least one circuit, the at least one portion of the at least one field based on the at least one indicator so as to generate a portion of an assembled document; and
   outputting the portion of the assembled document by the at least one circuit.

9. The method of claim 8, wherein the template comprises an XML template and the at least one field comprises an XML element.

10. The method of claim 8, wherein the assembled document is reduced in size relative to the document as copied from the template.

11. The method of claim 8, wherein the at least one specified character value comprises a NULL value of a character encoding of the document.

12. The method of claim 8, wherein accessing the document memory by the circuit is via a DMA interface that is separate from a memory interface of the processor.

13. The method of claim 8, wherein the at least one field comprises a plurality of fields and wherein storing the characters comprises each of a plurality of processors concurrently storing the characters based on data associated with a respective at least one of the fields to a location of the memory associated with the respective at least one of fields.

14. A system for assembly of structured documents, the system comprising:
- a memory;
- means for storing documents;
- means for identifying a template for generating a document, wherein the template defines at least one field having a specified position and length within the document;
- means for storing a copy of the template to the memory so as to initialize the document;
- means for storing characters based on data associated with the at least one field to a location of the memory associated with the at least one field of the document; and based at least in part on the text and the length of the field,
- means for storing, to portions of the memory associated with the document, at least one indicator of at least one portion of the at least one field to be removed from the document;
- wherein the at least one indicator of the at least one portion of the at least one field to be removed comprises at least one specified character value;
- wherein the at least one specified character value comprises at least two byte values, the byte values comprising a first of the byte values indicative of a start-of-heading of a character encoding of the document and at least a second of the byte values indicative of a number of characters to be removed from the document; and
- means for accessing the document from the memory and removing the at least one portion of the at least one field based on the at least one indicator so as to generate a portion of an assembled document.

* * * * *